(12) United States Patent
Alden

(10) Patent No.: US 6,456,440 B1
(45) Date of Patent: Sep. 24, 2002

(54) REMOTE VIEWING PROCESS AND APPARATUS

(76) Inventor: Ray M. Alden, 808 Lake Brandon Trail, Raleigh, NC (US) 27610

( * ) Notice: Subject to any disclaimer, the term of this patent is extended or adjusted under 35 U.S.C. 154(b) by 0 days.

(21) Appl. No.: 09/469,407

(22) Filed: Dec. 29, 1999

(51) Int. Cl.[7] .............................................. G02B 25/00
(52) U.S. Cl. ...................................................... 359/643
(58) Field of Search ................................. 359/643, 644, 359/645, 646, 647

(56) References Cited

U.S. PATENT DOCUMENTS 4,828,348 A * 5/1989 Pafford ........................ 359/399
5,054,225 A * 10/1991 Giuffre et al. ................. 42/101
5,067,804 A * 11/1991 Kitajima et al. ............. 359/369

* cited by examiner

Primary Examiner—Scott J. Sugarman

(57) ABSTRACT

The invention described herein represents a significant improvement for the telescope hobbyist. It provides a remote eyepiece system that enables a user to optically view objects through a telescope while sitting in the comfort of their living room sofa. This is achieved when the user has the present remote wearable mobile eyepiece. An electromagnetic beacon signal communicates the position of the user's eyepiece, software calculates location and how trajectory is needed to send the object light to the user's location, and software instructs micro stepping servomotors to correctly position mirrors accordingly. The components enable the system to track the physical location of the user's eyepiece and to optically direct the light for the object to the user's viewing eyepiece apparatus.

17 Claims, 11 Drawing Sheets

REMOTE VIEWING PROCESS AND APPARATUS

BACKGROUND FIELD OF INVENTION

The optical telescope is thought to have been invented in Holland in 1608. It was then observed that distant objects appeared closer when viewed through two lenses brought into alignment. Since this date, many improvements have been made on the telescope. Today telescopes used by scientists at large observatories may use combinations of many mirrors and lenses to view objects in the visible and non-visible energy spectrums. Other complex telescope devices operate from aircraft, space probes, and even as satellites of earth to observe terrestrial and extraterrestrial objects.

Today, complex, highly sensitive telescope instruments are also available to the home hobbyist. Systems may include computer software packages that enable even a novice to find desired extraterrestrial objects in the sky from their position on the earth at any desired point in time. Systems include software and servomotor actuators integrated to enable the telescope to be directed by software or by a user through a key pad or through a joy stick user interface. The software can take into account and automatically offset the motion of the earth to ensure that the user can view distant objects steadily.

What hasn't changed for the user is the generally awkward physical position that one must assume to optically view objects through a telescope. A user must bring their eye to an eye piece connected to the telescope. This makes it physically difficult or uncomfortable for the user to view objects for extended periods of time. Additionally multiple users must take turns, one at a time, to each view an object through one telescope. The awkwardness of setting up and using even modern telescopes reduces the time that users would otherwise use their telescope instruments. What is needed is a mechanism to enable users to optically view objects through their telescopes from the comfort of their living room sofa. Such a mechanism would free the user from the awkwardness of physically being in close proximity to the actual telescope instrument in order to use the device. Additionally the optimal mechanism would enable multiple users to optically view objects through the same telescope simultaneously

BACKGROUND DESCRIPTION OF PRIOR INVENTION

The field of telescopes includes four hundred years of steadily improving invention. The significance of viewing extraterrestrial objects in particular can not be understated because of the enormous changes the knowledge gained has brought to the western world. It was telescope optics that changed many people's beliefs in a geocentric universe to belief in a universe where earth is but one of many billions of objects. Much of the most significant work done with telescopes today still focuses on exploring the universe. Additionally, telescope optics enable military intelligence to closely monitor activities of potential enemies. Due to these significant contributions, great resources have been devoted to improving the optics and operation of telescopes. All of the development in the area of telescope optics and operation has generated an abundance of improvements. Clearly the prolific invention in the fields relating to telescopes is a crowded one.

What hasn't changed for the hobbyist user is the generally awkward physical position that one must assume to optically view objects through a telescope. A hobbyist user must bring their eye to an eye piece connected to the telescope. This makes it physically difficult or uncomfortable for the user to view objects for extended periods of time. Additionally multiple users must take turns, one at a time, to each view an object through one telescope. The awkwardness of setting up and using even modern telescopes is a significant downside that reduces the time that users would otherwise use their telescope instruments. What is needed is a mechanism to enable users to optically view objects through their telescopes from the comfort of their living room sofa. Such a mechanism would free the user from the awkwardness of physically being in close proximity to the actual telescope instrument in order to use the device. Additionally the optimal mechanism would enable multiple users to optically view objects through the same telescope simultaneously

SUMMARY

The invention described herein represents a significant improvement for the telescope hobbyist. It provides a remote eyepiece system that enables a user to optically view objects through a telescope while sitting in the comfort of their living room sofa. This is achieved when the user has the present remote wearable mobile eyepiece. An electromagnetic beacon signal communicates the position of the user's eyepiece, software calculates location and how trajectory is needed to send the object light to the user's location, and software instructs micro stepping servomotors to correctly position mirrors accordingly. The components enable the system to track the physical location of the user's eyepiece and to optically direct the light for the object to the user's viewing eyepiece apparatus.

OBJECTS AND ADVANTAGES

Accordingly, several objects and advantages of my invention are apparent. The telescope eyepiece of the present invention is a remote unit. The invention uses an electromagnetic beacon signal to locate the precise positional relationship between user's remote eyepiece and the image from the telescope. Software integrated with stepping servo motors continuously directs the light from the object precisely to the user's eyepiece. The user is thus freed from contact with any part the telescope except the remote eyepiece which they might choose to wear. This invention enables the user to move her head freely and to physically move to different positions within a room without personally making any equipment adjustments because the locating system and integrated servomotors will continue to project the object beam to the user's eyepiece. Additionally, multiple users with remote eyepieces may likewise view the object through the telescope nearly simultaneously. Further objects and advantages will become apparent from a consideration of the drawings and ensuing description.

DRAWING FIGURES

Figure 1:
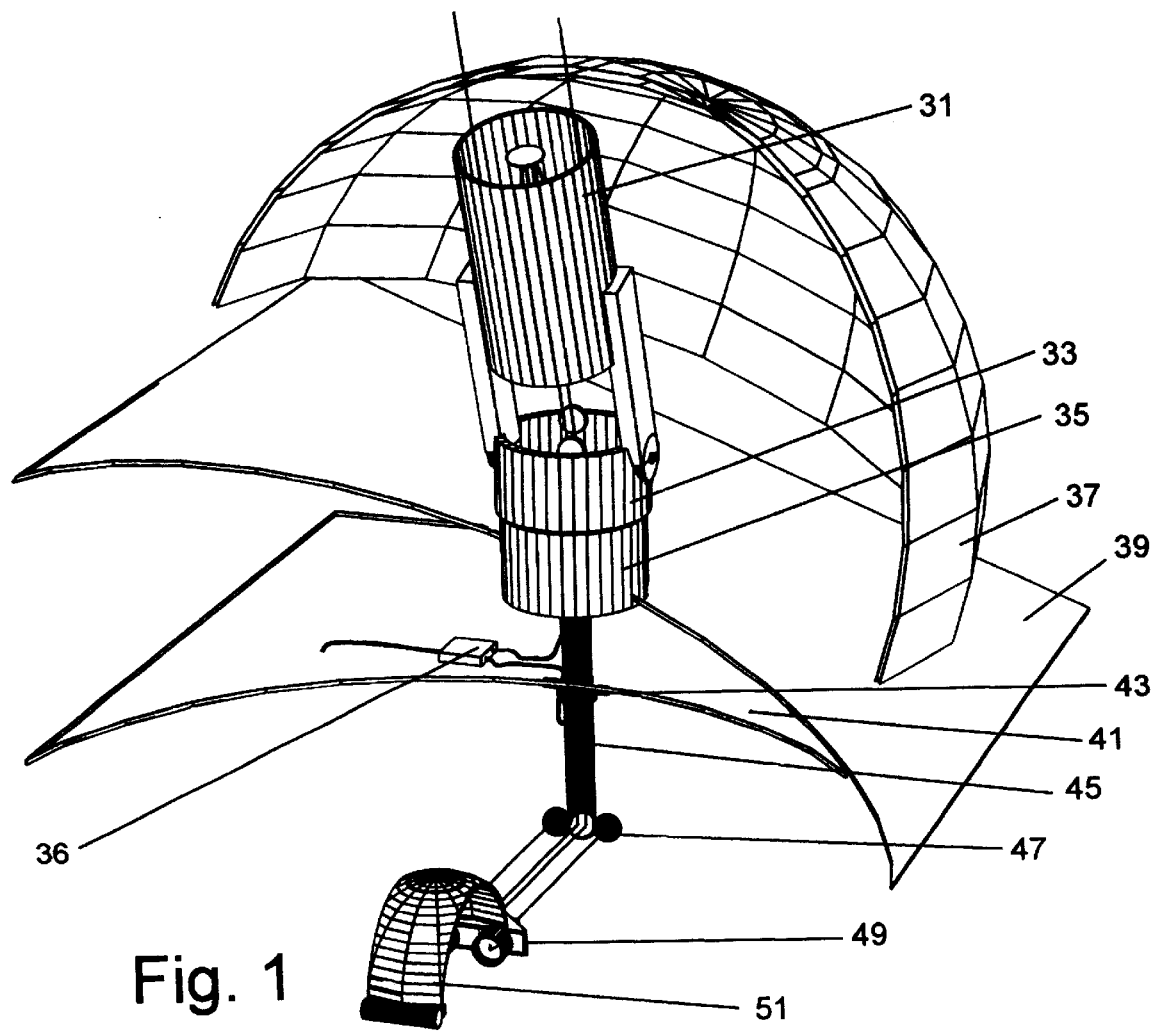
FIG. 1 shows a broad over view of some of the components of the present invention.

REFERENCE NUMERALS IN DRAWINGS 31 telescope housing
33 rotating base
35 leveling stationary base
36 CPU
37 dome
39 roof
41 ceiling
43 ceiling stationary mount
45 rotating cylinder
47 beacon receiver/image sender assembly
49 remote viewing apparatus
51 attachable head mount
53 light from object
55 primary mirror
56 variable angle bracket
57 first reflection
59 secondary mirror
61 secondary reflection
62 mirror mount
63 upper directing mirror
64 upper directional stepping motor
65 lower directing mirror
66 lower directional stepping motor
67 beam in channel
69 rotating stepper motor
71 angular stepper motor
75 cutaway rotating base
77 cutaway stationary base
79 sender/receiver rotating stepper motor
83 rotating flange
85 sending mirror angular stepper motor
86 angle gear
87 sending mirror
89 beacon sensor
91 beacon
93 afocal beam in air
95 beacon sender
97 splitting prism
99 remote mirror
101 eyepiece lens set
103 focused image
105 remote eyepiece housing
107 enlarged remote optics
109 enlarged light trail
111 beacon from camera
113 beacon sending from camera
115 camera/beacon mounting apparatus
117 camera
119 camera tripod
121 beacon from night scope
123 beacon sending from night scope
125 night scope/beacon mounting apparatus
127 night view scope

DESCRIPTION

FIG. 1 shows a broad over view of some of the components of the present invention. A 31 telescope housing contains the primary and secondary mirror elements of a reflecting telescope. It is manufactured from a rigid material such as molded plastic and is shown mounted on top of a 33 rotating base. The 33 rotating base is manufactured from a rigid material such as molded plastic, it resides atop of a 35 leveling stationary base. The 35 leveling stationary base is manufactured from a rigid material such as molded plastic, it is permanently mounted through the surface of a 39 roof of a structure such as a residence. The 39 roof is shown cut away for illustration purposes. A 37 dome is made from transparent plastic and is shown cut away for illustration. The 37 dome is mounted to the 39 roof so as to protect the other components from weather. A 41 ceiling of a residential structure has had a hole cut through it to enable light from the telescope to pass through the 41 ceiling. The 41 ceiling is shown cut away for illustration. A 43 ceiling stationary mount has been affixed to the downward facing surface of the ceiling, it has a hole in it's center through which light from the telescope passes. A CPU is mounted to the top of the ceiling. It is hardwired to the residence's electricity and to all of the sensors and motors described herein. A 45 rotating cylinder protrudes downward from the 43 ceiling stationary mount. The 45 rotating cylinder is hollow such that light passes down its length. A 47 beacon receiver is affixed to the bottom of the 45 rotating cylinder. The 47 beacon receiver is manufactured from an array of photosensitive CdS cells configured in the form of a ball. An identical ball also resides on the other side of the 45 rotating cylinder. A 49 remote viewing apparatus shown here floating in free space would actually be worn by a user. A 51 attachable head mount is designed to enable a user to wear the 49 remote viewing apparatus. The 51 attachable head mount is manufactured from a molded plastic shell. Pads fastened internally accommodate different head sizes and batteries in a compartment on the back to help offset the 49 remote viewing apparatus' weight.

Figure 2:
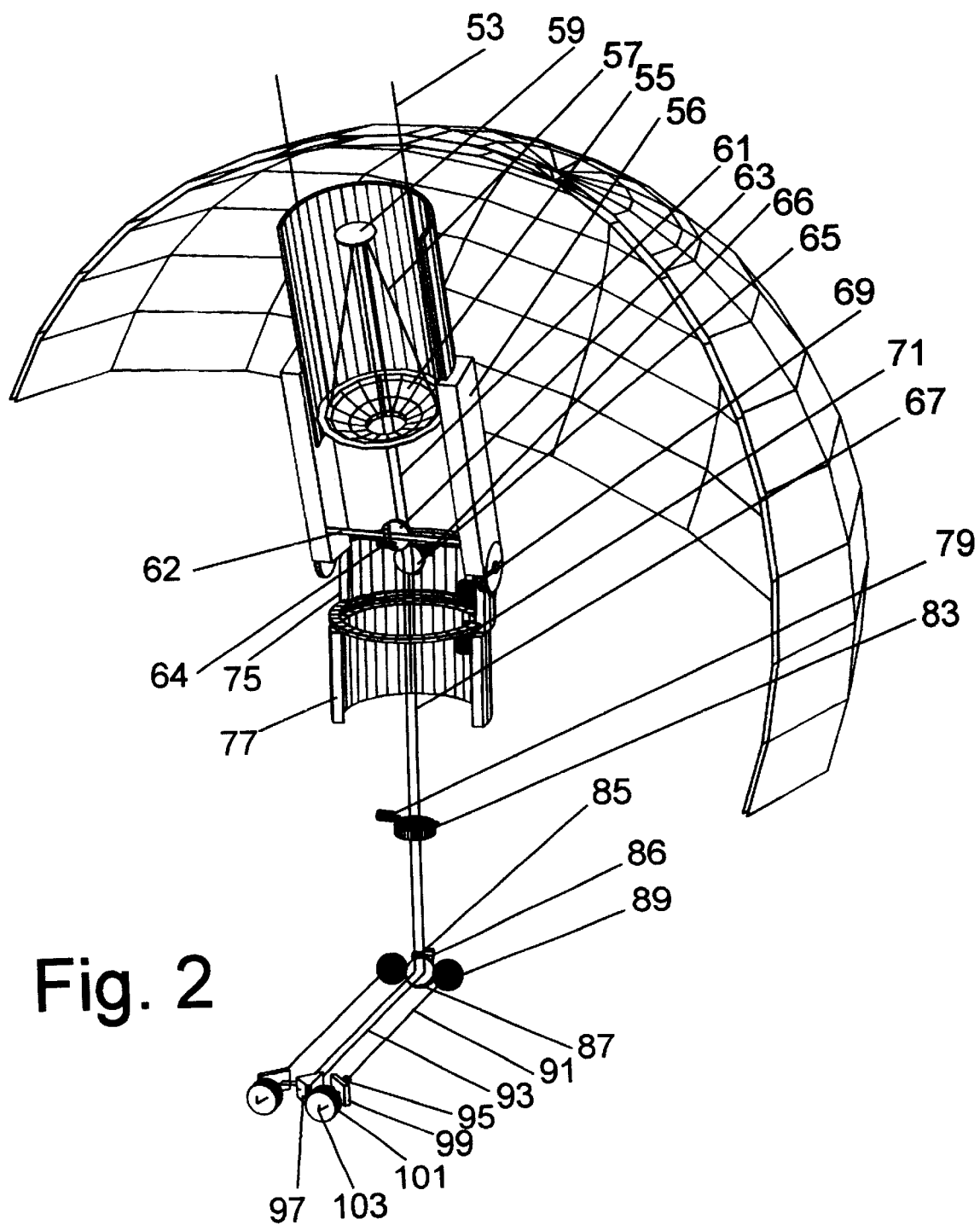
FIG. 2 shows the main optical elements of the components of FIG. 1. Also shown are actuators/sensors.

FIG. 2 shows the main optical elements of the components of FIG. 1. Also shown are actuators/sensors. A 53 light from object is illustrated as a line from infinity. The 53 light from object is reflected off a 55 primary mirror. The reflected light is shown as a 57 first reflection. A 59 second mirror causes the light to reflect in a 61 secondary reflection. The 61 secondary reflection is an afocal beam. A 63 upper directing mirror may receive the beam from the secondary beam (but is shown not doing so) and is shown mounted from the top to a 56 variable angle bracket via a hinge at the top of the 63 upper directing mirror and a cross bar connected to each variable angle brackets. The 63 upper directing mirror is connected at the bottom by a semi round gear, the teeth of which interface with a 64 upper directional stepping motor. The 64 upper directional stepping motor is mounted to the same cross bar as is the 63 upper directing mirror. The 61 secondary reflection light is reflect again off of a 65 lower directing mirror (the light may come from the 59 secondary mirror directly, or indirectly when reflected off of the 63 upper directing mirror). The 63 upper directing mirror is four inches in diameter The 65 lower directing mirror is positioned at the center of the telescope's angle of rotation such that it always receives the column of light from the 59 secondary mirror. The 65 lower directing mirror is mounted from the top to the 56 variable angle bracket via a hinge at the top of the 65 lower directing mirror and a cross bar connected to each of the two variable angle brackets. The 65 lower directing mirror is connected at the bottom by a semi round gear, the teeth of which interface with a 66 lower directional stepping motor. The 66 lower directional stepping motor actuates the 65 lower directing mirror to ensure that it always directs the 61 secondary reflection down the same channel. The 65 lower directing mirror is four inches in diameter. The 66 lower directional stepping motor is mounted to the same cross bar as is the 65 lower directing mirror. The 64 upper directional stepping motor and 66 lower directional stepping motor are commanded by computer processing unit software that uses input about the telescope's angular position to calculate how many microns they must move to ensure proper direction of a 67 beam in channel. The 67 beam in channel is the only component of the light route from an object to an observer that must be constant regardless of the position of the telescope or of the position(s) of the observer(s). A 69 stepping motor is mounted on 77 cutaway stationary base while the actuating gear teeth of the 69 stepping motor interface with the gear teeth of the 75 cutaway rotating base. A 71 angular stepping motor is mounted in the 75 cutaway rotating base with its actuating gear teeth interfacing with gear teeth on the rounded base of the 56 variable angle bracket. The 56 variable angle bracket is mounted to the 75 cutaway rotating base by a pivot point that enables it to rotate when actuated by the 71 angular stepping motor. A 79 sender/receiver rotating stepper motor is mounted on the 41 ceiling mount of FIG. 1. The 79 sender/receiver rotating stepper motor's actuating gear teeth interface with the gear teeth of a 83 rotating flange. The 83 rotating flange is mounted to the 45 rotating cylinder of FIG. 1. A 85 sending mirror angular stepper motor is attached at the bottom of the 45 rotating cylinder of FIG. 1. The actuating gear teeth of the 85 sending mirror angular stepping motor interface with the teeth of a 86 angle gear. The 86 angle gear is mounted on the back of a 87 sending mirror. The 87 sending mirror is mounted at its top to the 45 rotating cylinder by a hinge on which it can pivot when actuated. The 87 sending mirror receives 67 beam in channel light and redirects it to a 93 afocal beam in air. The 87 sending mirror is four inches in diameter. An 89 beacon sensor is mounted to the sides of the 87 sending mirror. It is manufactured from a series of CdS cells that measure and report photo energy. The 89 beacon sensor receives a 91 energy beacon from a 95 beacon sender. The 95 beacon sender is mounted on the 49 remote viewing apparatus of FIG. 1. The 95 beacon sender sends the 91 energy beacon through the air to enable the 89 beacon sensor to report energy received by each of its component cells to the computer processing unit. The computer processing unit uses the sensor signals to determine the beacon's trajectory and then calculates the position of the 49 viewing apparatus. A 97 splitting prism receives the 93 afocal beam in air. The 97 splitting prism is housed within the 49 remote viewing apparatus of FIG. 1. To create a binocular view, half of the light is reflected off of the 97 splitting prism toward one set of eyepiece optics. The other half of the light is reflecting within the prism toward the other set of eyepiece optics including a 99 remote mirror. The 99 remote mirror is mounted within the 49 remote viewing apparatus of FIG. 1. Object light from the 97 splitting prism is reflected off the 99 remote mirror toward the 101 eyepiece lens set. The 101 eyepiece lens set has a one and one quarter inch diameter and it causes the object light to come to a 103 focussed image. Light is focused in the observer's eye (not shown).

Figure 3:
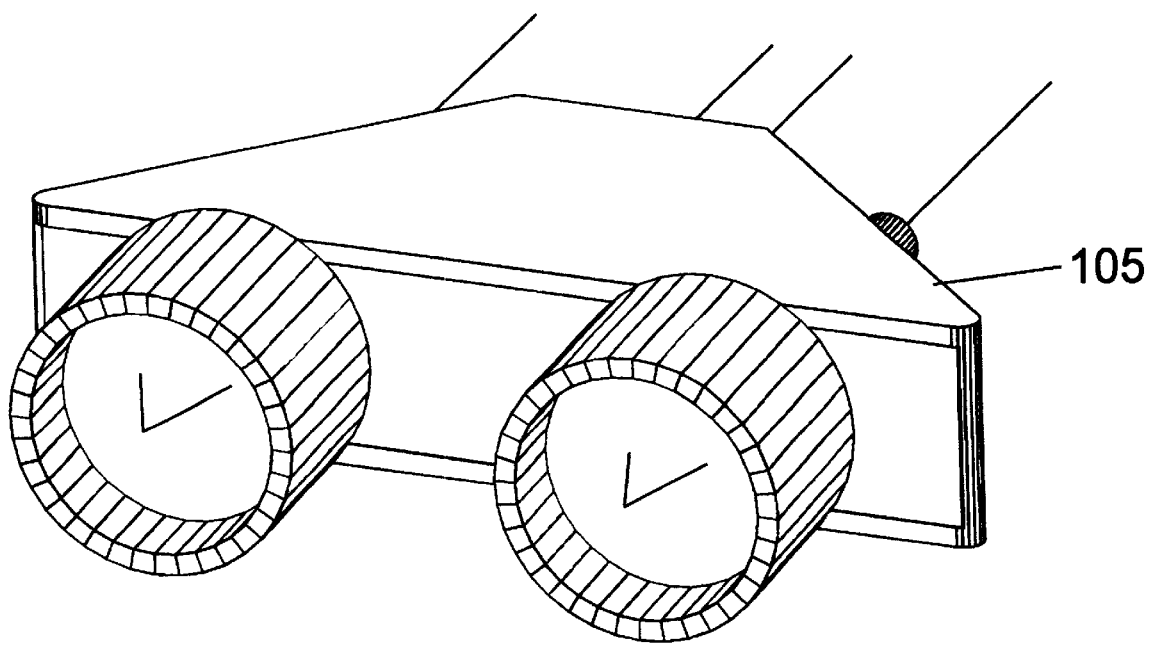
FIG. 3 is a close up view of a fully assembled 105 remote eyepiece housing. The 105 remote eyepiece housing houses the remote viewing optics and the beacon sender as described in FIG. 2.

FIG. 3 is a close up view of a fully assembled 105 remote eyepiece housing. The 105 remote eyepiece housing houses the remote viewing optics and the beacon sender as described in FIG. 2.

Figure 4:
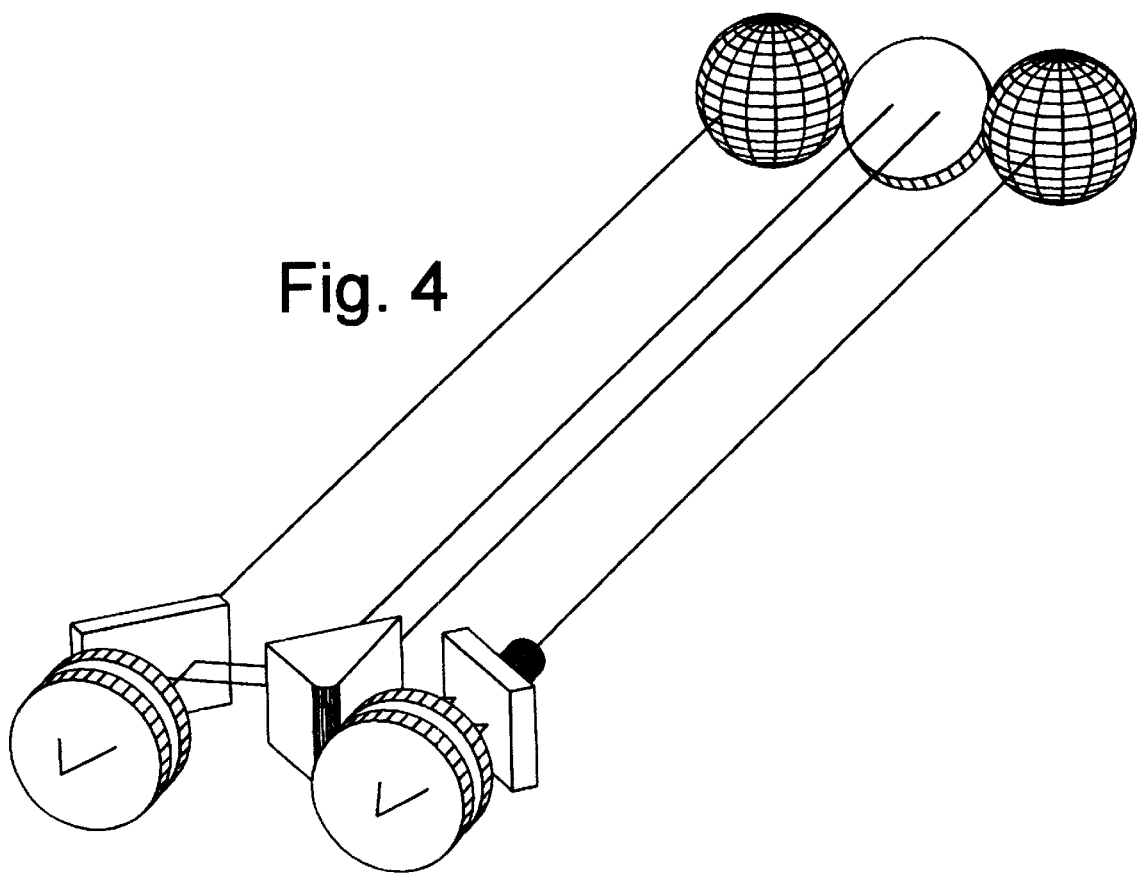
FIG. 4 is a close up view of the optics of the remote viewing apparatus and the sender/receiver components described in FIG. 2.

FIG. 4 is a close up view of the optics of the remote viewing apparatus and the sender/receiver components described in FIG. 2.

Figure 5:
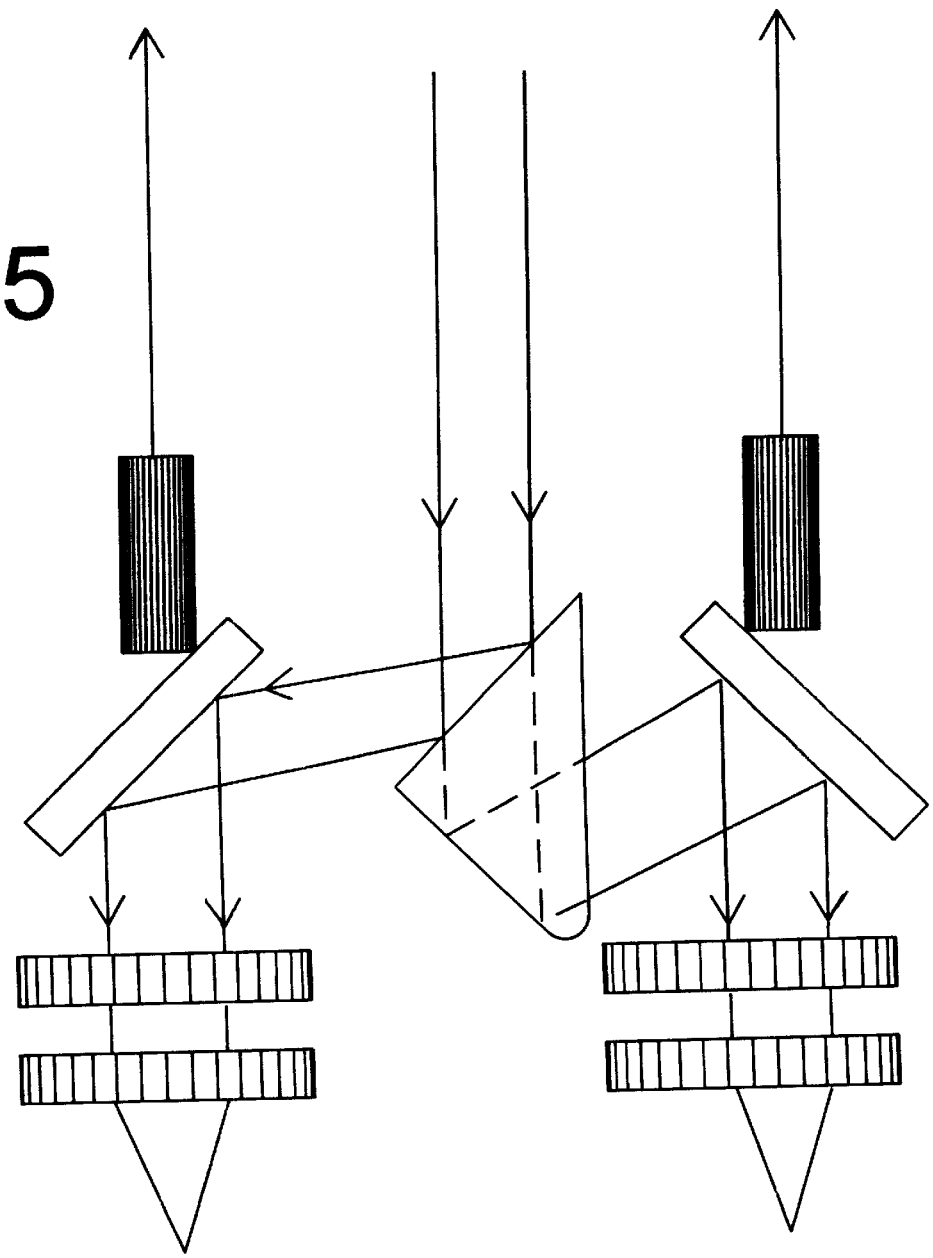
FIG. 5 is a close up view of object light traveling through the remote viewing apparatus as described in FIG. 2.

FIG. 5 is a close up view of object light traveling through the remote viewing apparatus and the light coming for the beacon senders as described in FIG. 2.

Figure 6:
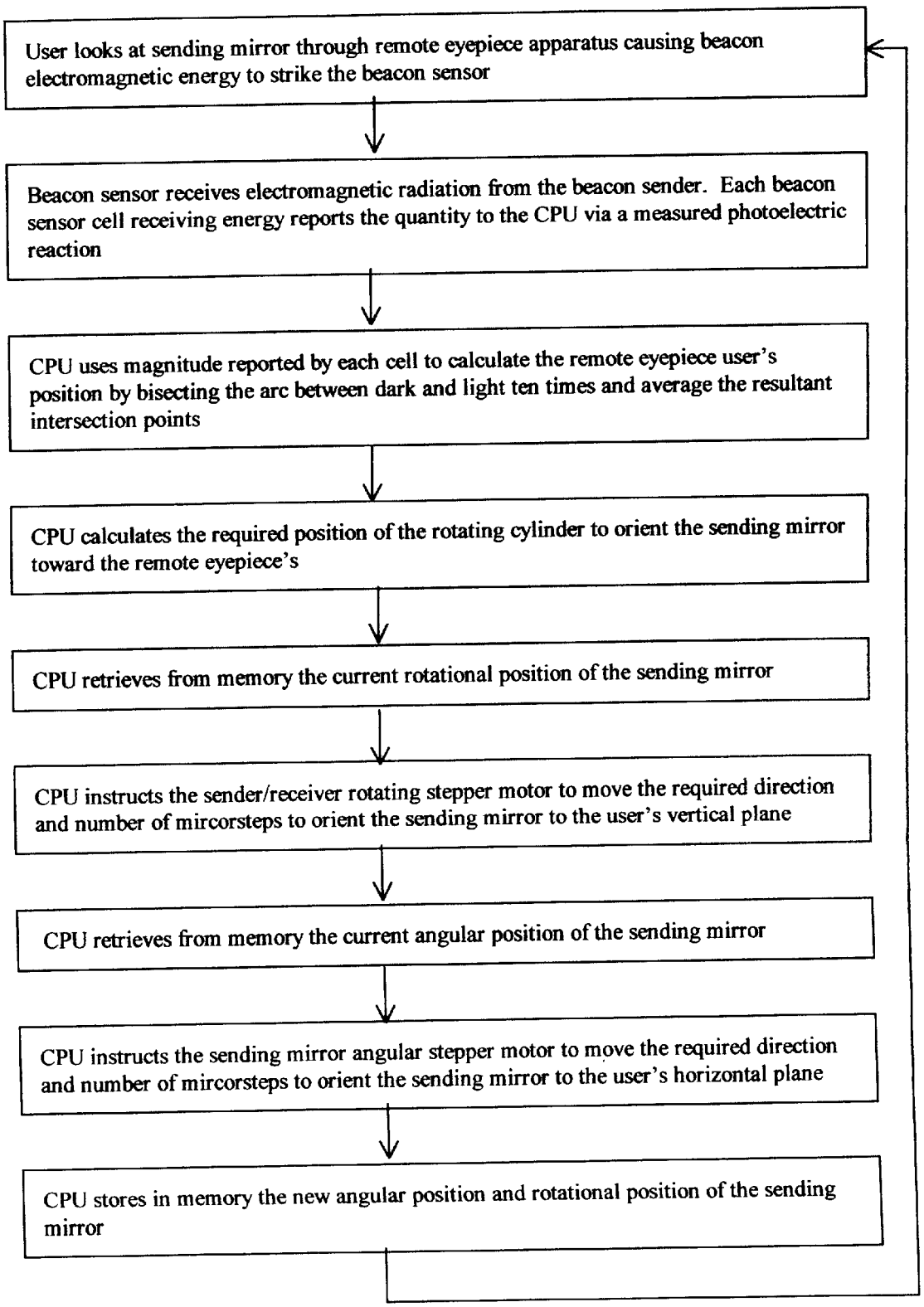
FIG. 6 is a flowchart describing the process by which the system locates the position of the user and directs the afocal beam to the user.

FIG. 6 is a flowchart describing the process by which the system locates the position of the user and directs the afocal beam to the user.

Figure 7:
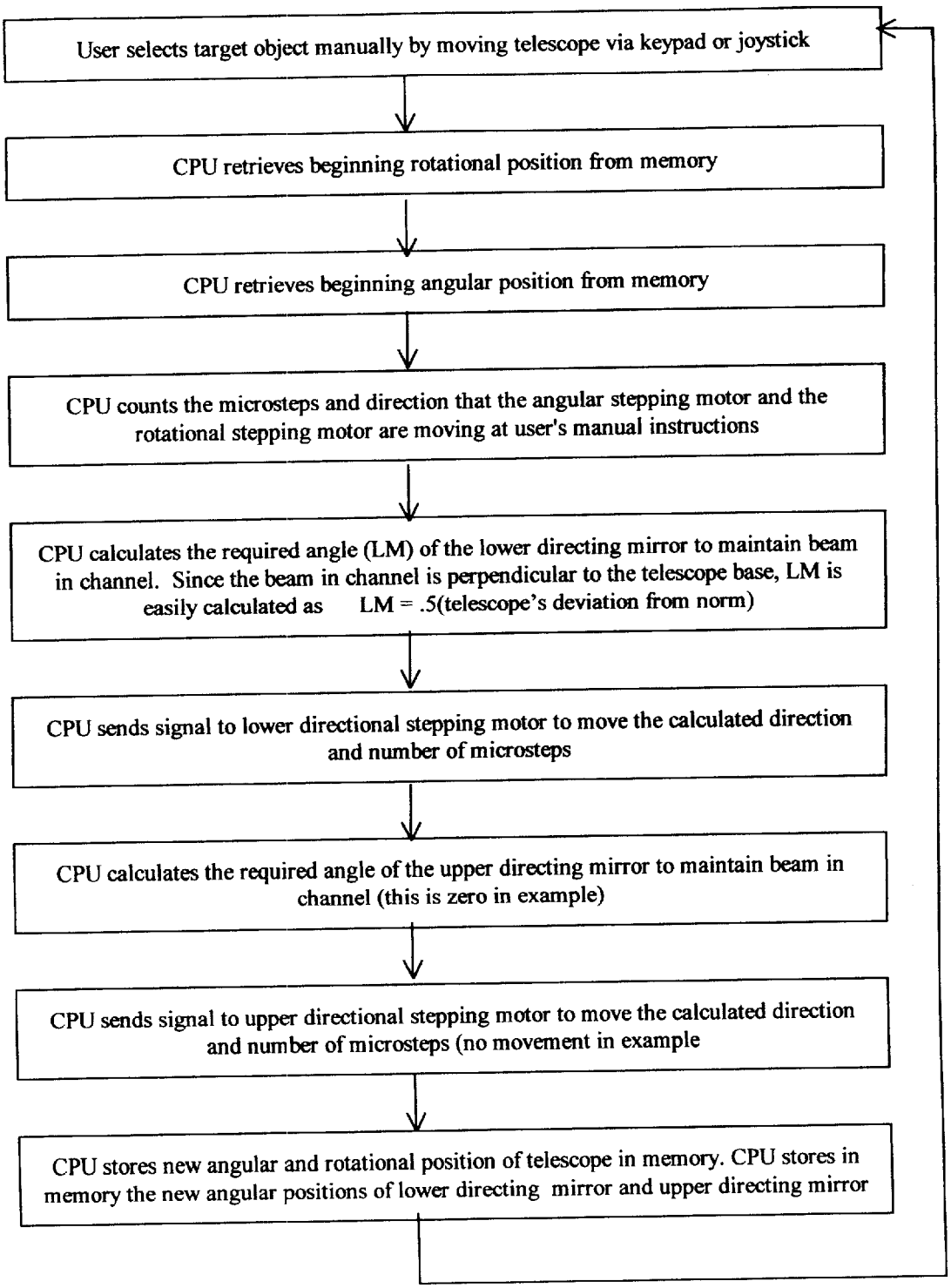
FIG. 7 is a flowchart describing the process of sending the object beam consistently through the channel where the user selects the target object manually.

FIG. 7 is a flowchart describing the process of sending the object beam consistently through the channel where the user selects the target object manually.

Figure 8:
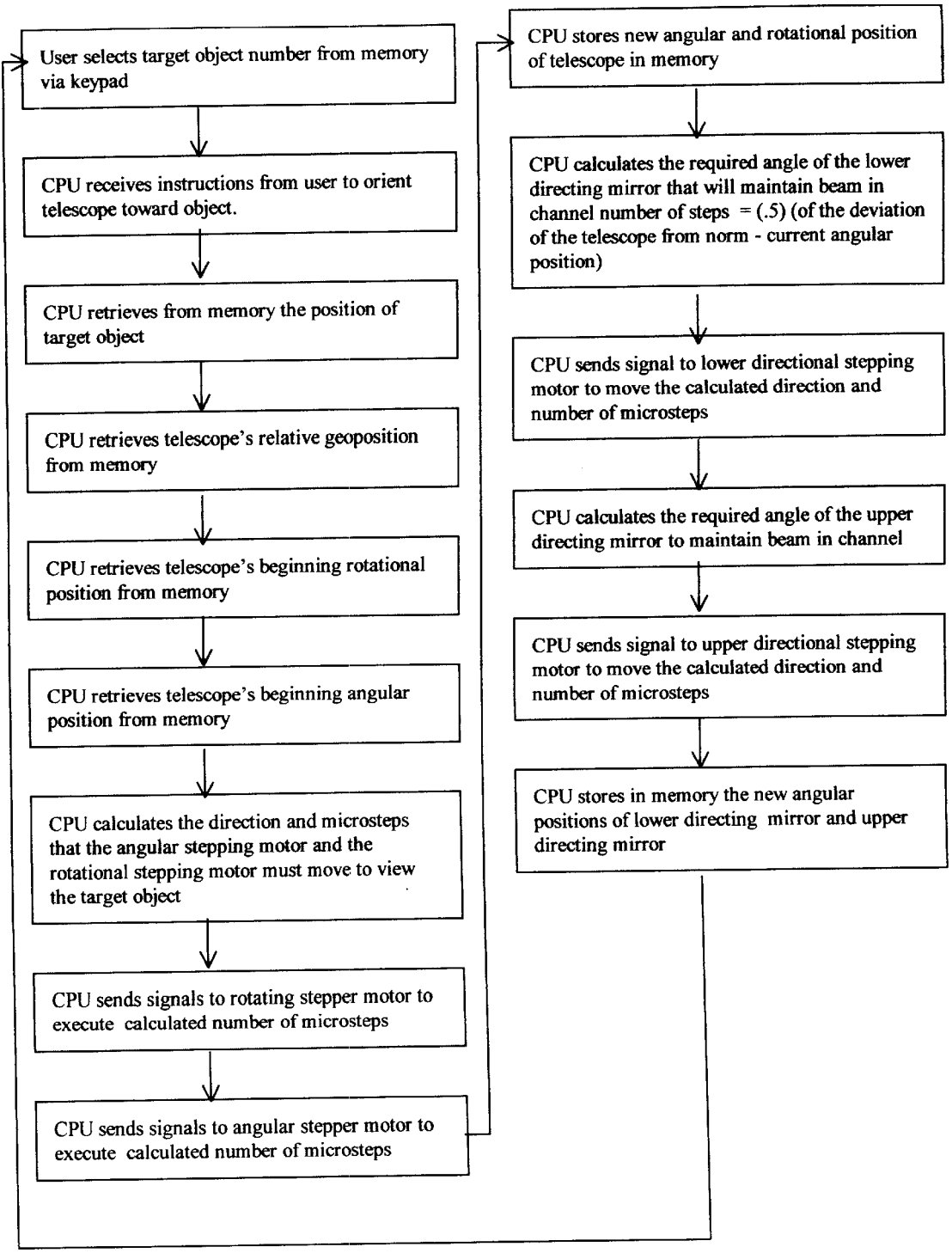
FIG. 8 is a flowchart describing the process of sending the object beam consistently through the channel where the user selects the target object from computer memory.

FIG. 8 is a flowchart describing the process of sending the object beam consistently through the channel where the user selects the target object from computer memory.

Figure 9:
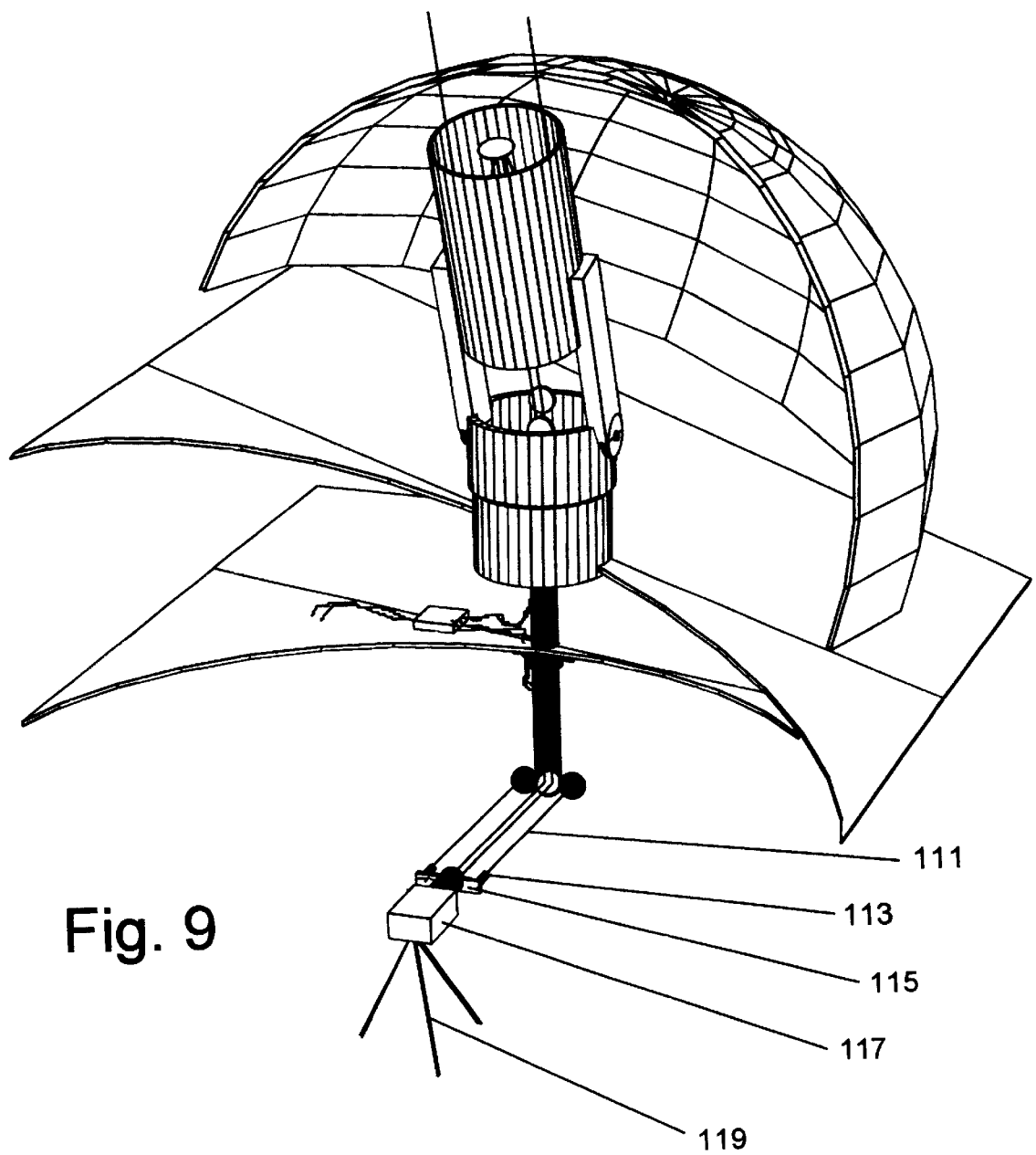
FIG. 9 illustrates a remote camera on tripod remotely receiving light from the telescope.

FIG. 9 illustrates a camera interfacing remotely with the telescope. A 111 beacon from camera is emitted from a 113 beacon sending from camera is sent to the telescope sensor as previously described. The 113 beacon sending from camera is harnessed to a 115 camera/beaon mounting apparatus. The 115 is mounted to a 117 camera. In the illustration, the camera sits atop a tripod but it can in practice also be hand held.

Figure 10:
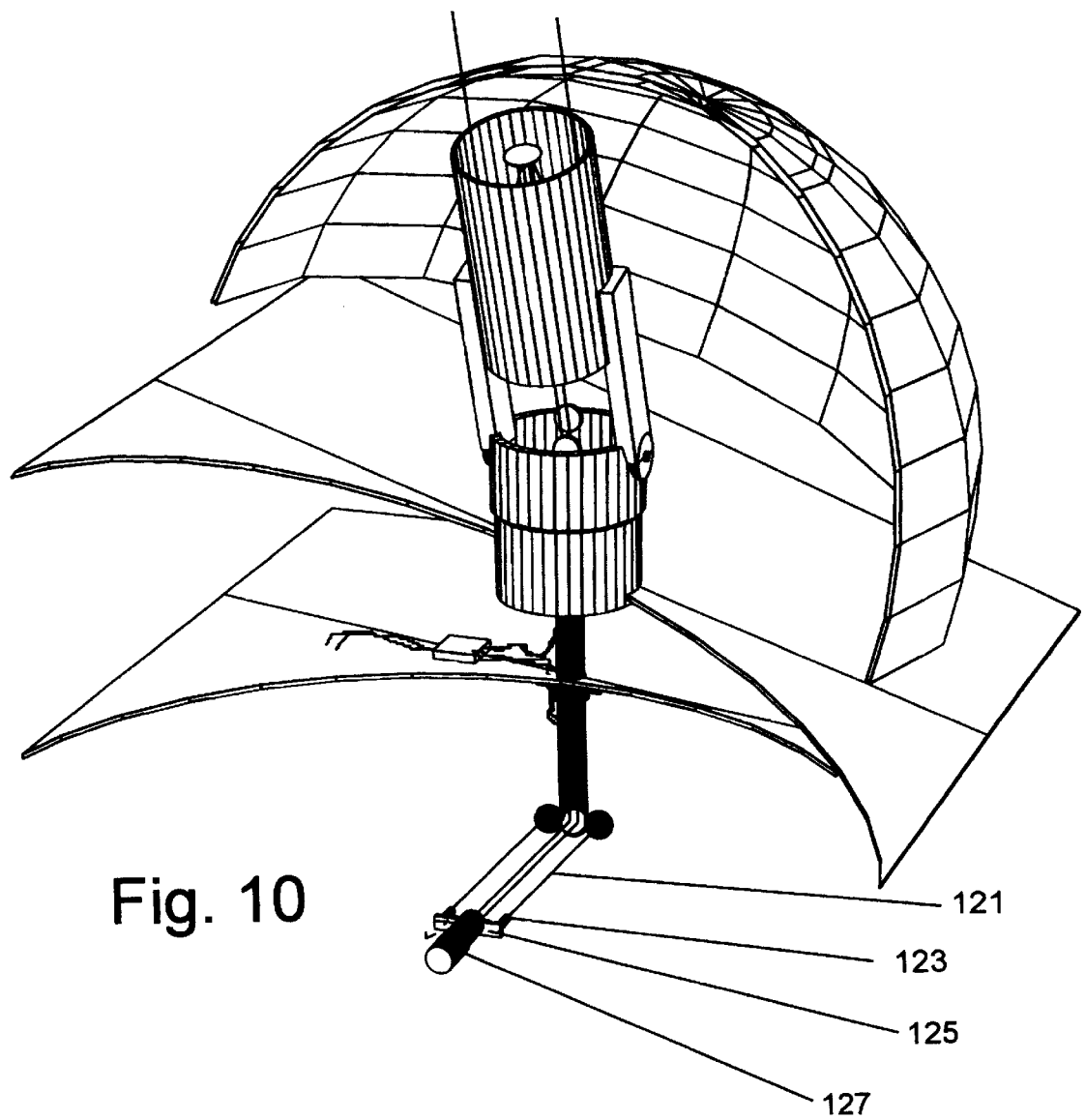
FIG. 10 shows a remote hand held night vision scope receiving light from a telescope.
Figure 11:
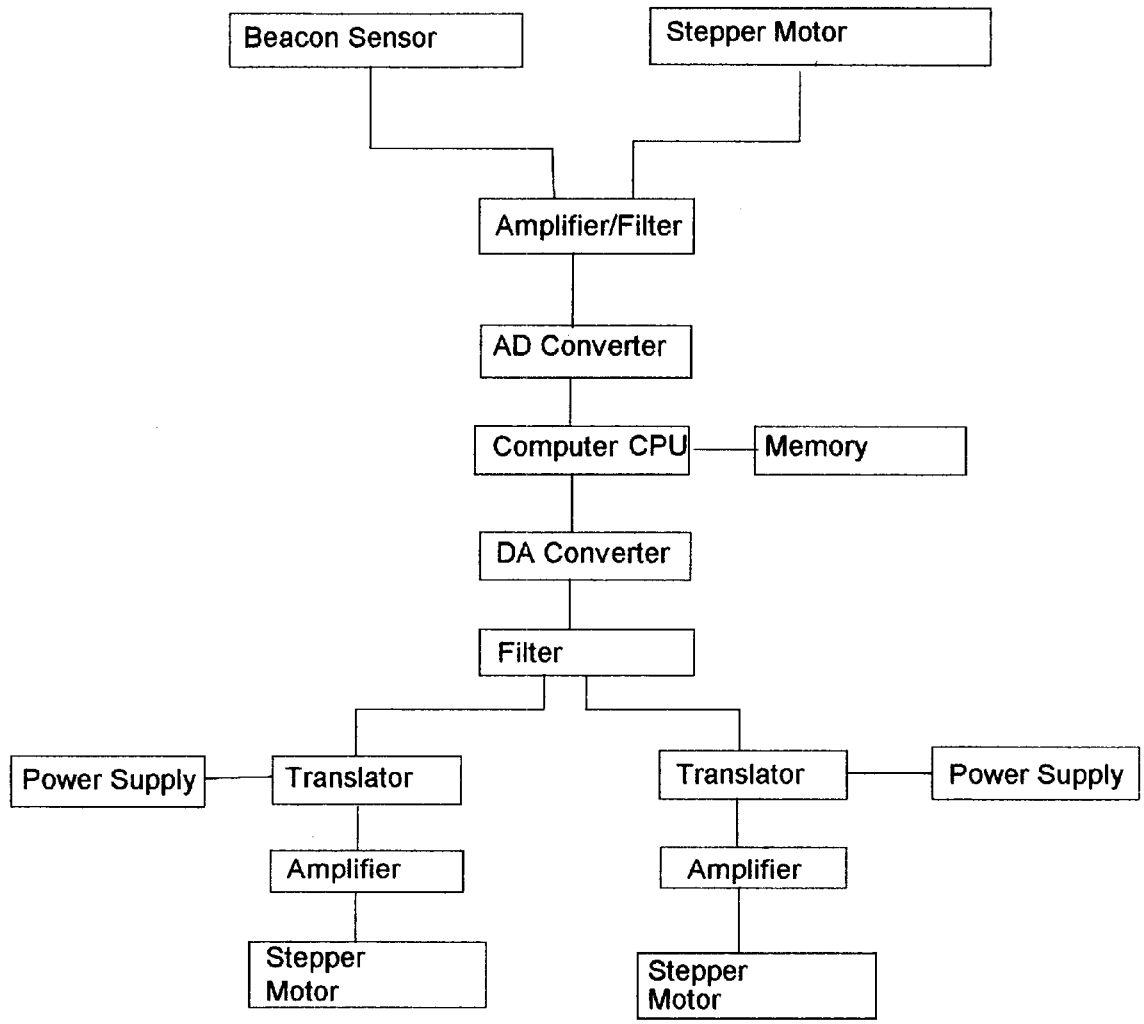
FIG. 11 shows a diagram of sensory, processing and actuatory components.

FIG. 10 illustrates a night scope interfacing remotely with the telescope. A 121 beacon from night scope is emitted from a 123 beacon sending from night scope is sent to the telescope sensor as previously described. The 123 beacon sending from night scope is harnessed to a 125 night scope/beaon mounting apparatus. The 125 is hand held by a user or alternately could be tripod mounted.

Operation of the Invention

FIG. 1 illustrates the main components of the present invention in operation. The 31 telescope housing can be user directed to receive light from a desired object. The telescope is mounted upon a 33 rotating base. The 33 rotating base is in turn mounted on the 35 leveling stationary base. This arrangement enables the 33 rotating base to turn atop the 35 leveling stationary base while maintaining a level orientation. The 35 level stationary base is mounted on top of the roof of a structure. The 37 dome is a rigid structure that prevents weather such as rain, snow, and possibly certain wavelengths of electromagnetic radiation from damaging the telescope hardware and electronics. The 39 roof shown here has a slope as is often the case with residential roofing. The 43 ceiling stationary mount is a round rigid structure which receives the 45 rotating cylinder. This arrangement enables the 45 rotating cylinder to rotate within the 43 ceiling stationary mount. This rotation is required so that the 47 beacon receiver/image sender assembly can rotate into the observer's viewing plane. The observer (not shown) is wearing the 49 remote viewing apparatus having placed the 51 attachable head mount on her head and placing the 49 remote viewing apparatus in front of her eyes.

FIG. 2 illustrates the light flow through the present invention as well as cutaway views to illustrate actuationg/sensor components. The user selects an object to view with the telescope. The telescope is positioned in the correct orientation to view the selected object using a 69 rotating stepper motor and a 71 angular stepper motor. The 69 rotating stepper motor rotationally actuates the 73 cutaway rotating base and the 71 angular stepper motor actuates angularly the telescope. These stepper motors are capable of micro stepping according to the instructions from the user translated by the CPU. Memory addresses store values that describe the telescope's rotational and angular positions at any point in time. The CPU uses this information to determine the number of micro steps and direction that the stepping motors must move to properly orient the telescope to view the selected object. Once the telescope is oriented to receive light from a desired object, the 53 light from object passes through the dome and strikes the 55 primary mirror. The 55 primary mirror reflects light in a 57 first reflection which is directed to the 59 secondary mirror. Light from the 59 secondary mirror is reflected in a 61 secondary reflection. Reflecting telescope components have been selected because mirrors don't produce as much chromatic aberration as do refracting components (which subjects object light to dispersion). Minimizing chromatic aberration is of paramount importance because light from the secondary optic is carried a much greater distance in the present invention compared to standard hobbyist telescopes. If refracting optics were used, the dispersive effect would be amplified as light travels from the 59 secondary mirror to the 101 eyepiece lens set. The present invention uses afocal reflected light to traverse this relatively large distance from the 59 secondary mirror to the 101 eyepiece lens set such that nearly no object light dispersion occurs. Once the telescope is oriented to view the object, the 63 upper directing mirror and the 65 lower directing mirror must be properly oriented. They must receive the 61 secondary reflection and redirect it to the 87 sending mirror. To achieve this the CPU uses the telescope position description information within the computer memory to calculate the trajectory of the 61 secondary reflection. It uses this information to calculate the necessary trajectory to reflect the beam to become the 67 beam in channel. Do to this process, the path of the 67 beam in channel is a constant no matter the orientation of the telescope. It is the upper directing mirror and the lower directing mirror that keep the trajectory constant of the 67 beam in channel. Once the computer calculates the required positions of the 63 upper directing mirror and the 65 lower directing mirror, the computer will direct them as required. The computer first reads memory cells containing information describing the current positions of the 63 upper directing mirror and the 65 lower directing mirror. It should be noted that in many telescope positions only the 65 lower directing mirror will be required to send the beam to the required 67 beam in channel trajectory. A way to illustrate this is to consider the case where the telescope is at a right angle relative to the 67 beam in channel. In this configuration, only the 65 lower directing mirror is required to reflect the light down the 67 beam in channel trajectory. In a second illustration of when the 63 upper directing mirror is required consider when the telescope is viewing nearly straight upward. The 65 lower directing mirror would be incapable of directing all of the light down the 67 beam in channel path. This is a case when the 63 upper directing mirror is required. The CPU uses all of this information to calculate the required orientation of the 63 upper directing mirror and the 65 lower directing mirror. The CPU instructs the 64 upper directional stepping motor to actuate the 63 upper directing mirror from its current position to that calculated (it will often require no movement as previously discussed). The CPU likewise instructs the 66 lower directional stepping motor to actuate the 65 lower directing mirror from its current orientation to that calculated to deliver the required reflection trajectory. Since the path that light from the object takes to reach the 87 sending mirror is a constant, the only consideration needed to position the 87 sending mirror is the location of the observer's viewing apparatus. More specifically, the 97 splitting prism is the first optical component of the viewing apparatus to receive light from the 87 sending mirror. The user of the viewing apparatus must look through the viewing apparatus toward the 87 sending mirror which is suspended from the ceiling by the 45 rotating cylinder (shown in FIG. 1). A light beam from the viewing apparatus is emitted by a 95 beacon sender in the form of a 91 beacon and detected by the 89 beacon sensor. The sensor consists of an array of photo sensitive plates in the form of a ball. Each photo sensitive plate that receives some of the 91 beacon light will emit an intensity describing signal that is ultimately received by the CPU. The CPU calculates the trajectory path of the 91 beacon light based on which photo sensitive cells have reported what levels of light received. Since the 91 beacon light's diameter exceeds the diameter of the 89 beacon sensor, half of the 89 beacon sensor will receive energy from the 91 beacon light. The CPU can determine the trajectory in two dimensions by bisecting the illuminated arc on the 89 beacon sensor. Since the 93 afocal beam in air is afocal, the depth of the remote viewing apparatus is not needed. The CPU uses this path to determine the required 93 afocal beam in air path required to reach the 97 splitting prism. The CPU retrieves from memory the current orientation of the 87 sending mirror and calculates what movement of the 79 sender/receiver stepper motor and of the 85 sending mirror angular stepper motor are required. The CPU sends instructions to the 79 sender/receiver rotating stepper motor to rotate the 45 rotating cylinder (shown in FIG. 1) the required number of micro steps. The CPU sends instructions to the 85 sending mirror angular stepper motor to pull or push the 86 angle gear which actuates the 87 sending mirror. Because the user wearing the remote viewing apparatus will frequently be moving, if only slightly, the 89 beacon sensor will constantly be sending new information to the CPU that requires microstep repositioning of the sending mirror. When executing this procedure, the 53 light from object is reaching the 97 splitting prism constantly. The 97 splitting prism splits the light to each of the eye piece lens sets. One side is reflected off of the 99 remote mirror. It then goes through the 101 eye piece lens set and is brought to a 103 focused image for the user's eye.

FIG. 3 is a close up illustration of the 105 remote eyepiece housing. Lines represent light leaving the beacons and entering the splitting prism. A user can hold this viewing apparatus in her hand or she can wear it. It can be used with or without eyeglasses.

FIG. 4 is a close up view of the optics and beacon components of the present invention.

FIG. 5 is a close-up view of the light flow through a binocular version of the present innovation.

FIG. 6 is a flowchart describing the process by which the system locates the position of the user and directs the afocal beam to the user.

FIG. 7 is a flowchart describing the process of sending the object beam consistently through the channel where the user selects the target object manually.

FIG. 8 is a flowchart describing the process of sending the object beam consistently through the channel where the user selects the target object from computer memory.

FIG. 9 illustrates a camera interfacing remotely with the telescope. A 111 beacon from camera is emitted from a 113 beacon sending from camera is sent to the telescope sensor as previously described. The 113 beacon sending from camera is harnessed to a 115 camera/beaon mounting apparatus. The 115 is mounted to a 117 camera. In the illustration, the camera sits atop a tripod but it can in practice also be hand held.

FIG. 10 illustrates a night scope interfacing remotely with the telescope. A 121 beacon from night scope is emitted from a 123 beacon sending from night scope is sent to the telescope sensor as previously described. The 123 beacon sending from night scope is harnessed to a 125 night scope/beaon mounting apparatus. The 125 is hand held by a user or alternately could be tripod mounted. The night scope may operate on one of two principles. It may electronically enhance visible electromagnetic radiation or it may electronically alter non visible electromagnetic radiation to make a representation of it in the visible spectrum.

Advantages

Many advantages of the preferred embodiment are present. Under the present invention, the user(s) of the telescope can sit in any comfortable position they choose instead of having to conform to a position dictate by the telescope's orientation and eyepiece location. This is possible because a series of sensors and actuators are used by a CPU to determine where the user is and to send the object light to her precise position. Moreover, the user can continually change position and the system follows their position to present uninterrupted viewing. Additionally, multiple users, each wearing headsets with eyepieces may all share the same view simultaneously or nearly simultaneously without having to rotate physical positions to go to an eye piece. Hobbyists especially will benefit from the present invention as they can enjoy optical viewing for long periods in the comfort of their own home and not subject to weather conditions.

Conclusion, Ramifications, and Scope

Thus the reader will see that the Remote View Apparatus of this invention provides a highly functional and reliable means for one or more observers to interface with the optical image from a telescope. Moreover, users need not come to the telescope to view the optical image because the present invention brings the image to one or more observers regardless of their physical location(s).

While my above description describes many specifications, these should not be construed as limitations on the scope of the invention, but rather as an exemplification of one preferred embodiment thereof. Many other variations are possible. Some examples follow.

The preceding disclosure described only one user with one remote binocular eyepiece using the device. Actually, multiple users, each wearing remote eyepieces can use the telescope alternately and nearly simultaneously. Doing this with ease and comfort would be a departure from having to rotate positions to view through a traditional telescope.

The remote eyepiece need not be binocular, in fact in many instances, considerations including cost, image clarity, and functionality, monocular remote eyepiece is more desirable. Nor does the remote eyepiece need to be worn. It could be hand held or even tripod based for example.

Also, the remote eyepiece may include night viewing optics and/or photo cells as well. Night viewing scopes have become very popular in recent years. A user could strap beacon senders to his night scope for example and view objects through the telescope using the invention described herein. The image from the telescope would be directed to the user's night scope. This would be of particular interest in viewing terrestrial objects at night and involve viewing indirectly electromagnetic energy outside of the visible spectrum. Similarly, such a beacon sender could be strapped to a camera such that the image from the telescope would be directed into the camera. This would enable viewer's to watch on TV and to record images without having to mess around with special camera mounts for the telescope that also impede optical viewing.

Many different beacon sending, receiving, and sensing configurations and devices are well know in the invention. Different types of energy can be used. The beacon could be sent from the sending mirror and received by the remote eyepiece apparatus for example. Many ways are known in the invention to ascertain the physical position of a remote object.

Additionally, the image on the sending mirror could be split then sent to multiple users simultaneously. Many telescope optics and eyepiece configurations are well know in the invention and could be easily supplemented for components described herein.

Also, the sending mirror could be more mobile. It could easily be made to move vertically or horizontally for example. The rotating cylinder supporting the sending mirror and beacon sensor don't necessarily need to be mounted to a ceiling. The rotating cylinder apparatus supporting them could be mounted to a floor or a wall for example. This offers the advantage that the user wouldn't have to look upward especially in the case of high ceilings.

Accordingly, the scope of the invention should be determined not by the embodiment(s) illustrated, but by the appended claims and their legal equivalents.

I claim:

1. An optical system comprising;
   a primary optic, and
   a remote eyepiece, wherein
      said remote eyepiece receives object light from said primary optic, and
      said remote eyepiece can move independently of said primary optic, and
      said light travels through air before reaching said remote eyepiece, and
         wherein energy transmitted through air is used to identify the location of the remote eyepiece relative to the primary optic.

2. The optical system of claim 1 wherein said remote eyepiece can be worn by a user.

3. The optical system of claim 1 wherein said remote eyepiece can be hand held.

4. The optical system of claim 1 wherein said primary optic is mounted on a building in which a user of said remote eyepiece is positioned.

5. The optical system of claim 1 wherein said primary optic is mounted on a conveyance in which a user of said remote eyepiece is positioned.

6. The optical system of claim 1 wherein said light is afocal before entering said remote eyepiece.

7. The optical system of claim 1 wherein a computer processing unit calculates the trajectory of said light.

8. The optical system of claim 1 wherein a computer processing unit directs the movement of one or more additional optical elements which receive light from the said primary optic and send light to the said remote eyepiece.

9. An optical system comprising;
a primary optic which receives light from an object, wherein
said light is directed through the air to a remote eyepiece, wherein
said remote eyepiece can move independently of said primary optic, and
a computer processing unit calculates the position of said remote eyepiece relative to said primary optic.

10. The optical system of claim 9 wherein said remote eyepiece can be worn by a user.

11. The optical system of claim 9 wherein said remote eyepiece can be hand held.

12. The optical system of claim 9 wherein said primary optic is mounted on a building in which a user of said remote eyepiece is positioned.

13. The optical system of claim 9 wherein said primary optic is mounted on a conveyance in which a user of said remote eyepiece is positioned.

14. The optical system of claim 9 wherein said light is afocal before entering said remote eyepiece.

15. The optical system of claim 9 wherein energy transmitted through air identifies the location of said remote eyepiece relative to said primary optic.

16. The optical system of claim 9 wherein a computer processing unit calculates the trajectory of said light.

17. The optical system of claim 9 wherein a computer processing unit directs the movement of one or more additional optical elements which receive light from the said primary optic and send light to the said remote eyepiece.

* * * * *